(12) United States Patent
Fukui

(10) Patent No.: US 9,092,882 B2
(45) Date of Patent: Jul. 28, 2015

(54) IMAGE PROCESSING APPARATUS

(71) Applicant: Panasonic Corporation, Osaka (JP)

(72) Inventor: Katsuyuki Fukui, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 20 days.

(21) Appl. No.: 14/200,237

(22) Filed: Mar. 7, 2014

(65) Prior Publication Data

US 2015/0178947 A1    Jun. 25, 2015

(30) Foreign Application Priority Data

Dec. 25, 2013    (JP) .................................. 2013-266824

(51) Int. Cl.
| | | |
|---|---|---|
| *G06K 9/00* | (2006.01) | |
| *G06T 7/40* | (2006.01) | |
| *G06K 9/46* | (2006.01) | |
| *G06T 5/00* | (2006.01) | |

(52) U.S. Cl.
CPC .............. *G06T 7/408* (2013.01); *G06K 9/4652* (2013.01); *G06T 5/00* (2013.01)

(58) Field of Classification Search
None
See application file for complete search history.

(56) References Cited

U.S. PATENT DOCUMENTS

| | | | |
|---|---|---|---|
| 6,850,272 | B1 * | 2/2005 | Terashita .................... 348/223.1 |
| 7,170,633 | B2 * | 1/2007 | Hara et al. ...................... 358/1.9 |
| 2004/0028271 | A1 * | 2/2004 | Pollard et al. .................. 382/162 |

FOREIGN PATENT DOCUMENTS

JP    2004-074793 A    3/2004

* cited by examiner

*Primary Examiner* — Sean Motsinger

(74) *Attorney, Agent, or Firm* — Rnner, Otto, Boisselle & Sklar, LLP

(57) ABSTRACT

Color correction of an image is implemented with a small circuit scale. A color correction section performs a color correction process on a pixel group-by-pixel group basis, and each pixel group is comprised of a plurality of adjoining pixels. A representative point generation section generates, e.g., a green (G) image signal of a representative point located as an imaginary point in the pixel group. A subtraction section subtracts the G-image signal of the representative point from an image signal of a G-pixel in the pixel group. A representative point color correction section performs the color correction process on the G-image signal of the representative point. An addition section adds the color-corrected G-image signal of the representative point to the output of the subtraction section.

7 Claims, 9 Drawing Sheets

IMAGE PROCESSING APPARATUS

CROSS-REFERENCE TO RELATED APPLICATION

This application claims priority to Japanese Patent Application No. 2013-266824 filed on Dec. 25, 2013, the entire disclosure of which is incorporated by reference herein.

BACKGROUND

The present disclosure relates to image processing apparatuses including a color correction section configured to perform a color correction process on an image signal.

Japanese Unexamined Patent Publication No. 2004-074793 discloses a method for performing color correction of an image in an image processing apparatus such as a camera. According to this method, color conversion is performed on a sub-sampled low frequency image, whereby a color-corrected image having as high resolution as before color correction can be provided by using a small circuit scale. In signal processing of an image with a large number of pixels, parallel processing is performed when the processing speed is not high enough. The circuit size for double parallel processing is twice that for normal parallel processing, and the circuit size for quadruple parallel processing is four times that for the normal parallel processing. In this regard, Japanese Unexamined Patent Publication No. 2004-074793 discloses a method in which color correction of only one of four pixels is performed so that only one circuit need be used.

SUMMARY

The present disclosure provides an image processing apparatus capable of performing color correction of even an image with a large number of pixels by using a small circuit scale.

An image processing apparatus according to the present disclosure includes: a color correction section configured to perform a color correction process on an image signal. The color correction section performs the color correction process on a pixel group-by-pixel group basis, each pixel group being comprised of a plurality of adjoining pixels. The color correction section includes a representative point generation section configured to generate an image signal of a predetermined color of a representative point located as an imaginary point at a position shifted from pixel positions of the pixel group, based on an image signal of a peripheral pixel of the representative point, a subtraction section configured to subtract the image signal of the representative point from an image signal of a pixel of the predetermined color in the pixel group, a representative point color correction section configured to perform the color correction process on the image signal of the representative point, and an addition section configured to add the image signal of the representative point after the color correction process of the representative point color correction section to the subtraction result of the subtraction section.

The image processing apparatus according to the present disclosure is effective in implementing color correction of even an image with a large number of pixels by using a small circuit scale.

DETAILED DESCRIPTION

Embodiments of the present disclosure will be described in detail with reference to the accompanying drawings, although unnecessarily detailed description may be omitted. For example, detailed description of the matters that are already well known in the art and repeated description of substantially the same configurations may be omitted. This is to avoid redundancy and to facilitate understanding of the present disclosure by those skilled in the art.

The inventor provides the drawings and the following description so that those skilled in the art can fully understand the present disclosure, and the drawings and the following description are not intended to limit the subject matter of the claims.

Description of delay adjustment is omitted for simplicity. The three primary colors of light of an image signal, namely red, green, and blue, are herein denoted by "R," "G," and "B," respectively.

A color correction process in the present disclosure is performed for various purposes. The color correction process is usually performed in order to make the tone of color of a captured image more natural. In addition, the color correction process can also be performed in order to adjust the tone of color of the image according to characteristics of a display monitor, or in order to intentionally change the tone of color of the image to a specific one.

First Embodiment

A first embodiment will be described below with reference to FIGS. 1 to 4. In the first embodiment, an imaging device configured to capture an image signal has pixels of R, G, and B at the same positions as final sample positions. For example, a three-CMOS camera corresponds to the imaging device.

[1-1. Configuration]

Figure 1:
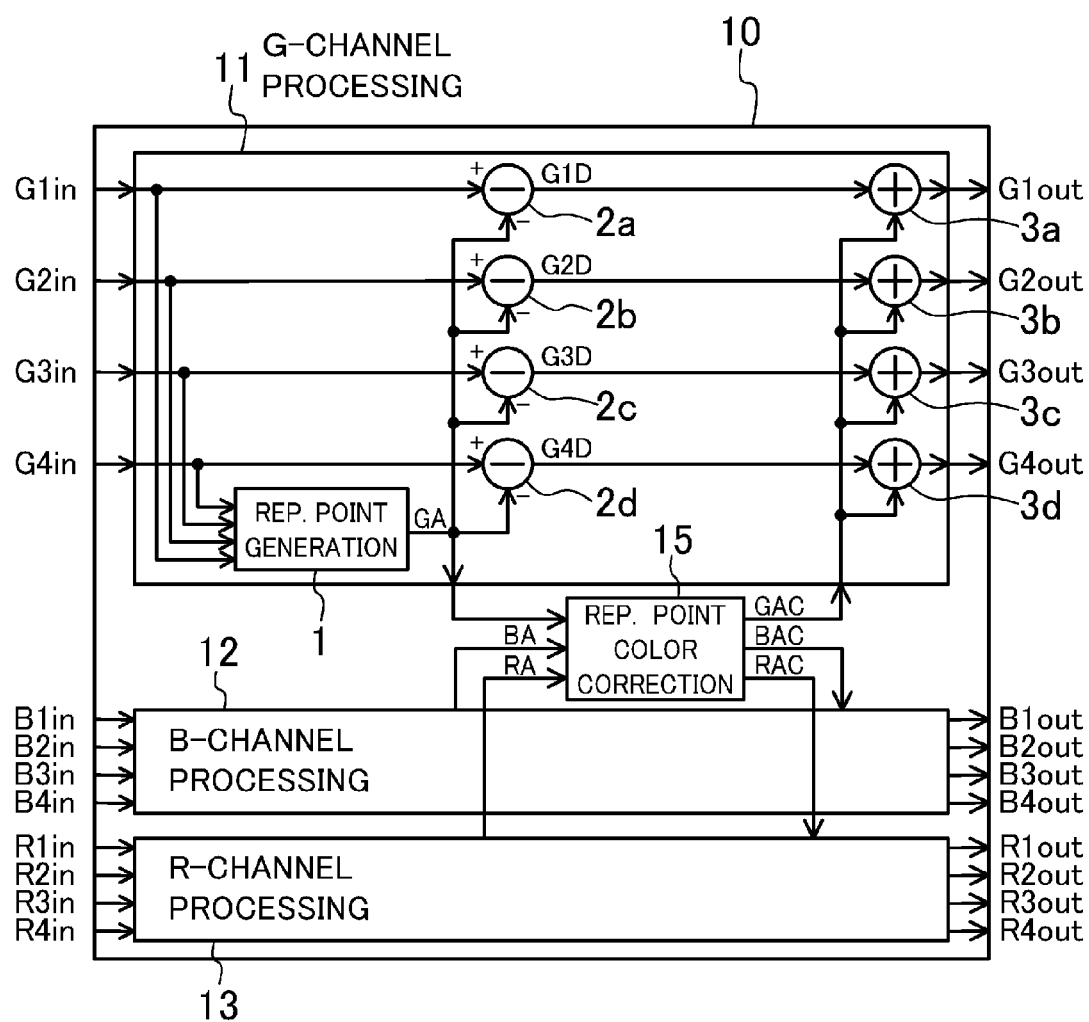
FIG. 1 is a configuration diagram of a color correction section according to a first embodiment.

FIG. 1 is a configuration diagram of a color correction section 10 according to the present embodiment. The color correction section 10 performs a color correction process on a pixel group-by-pixel group basis, and each pixel group is comprised of four adjoining pixels. The color correction section 10 includes a G-channel processing section 11 configured to process a G-signal, a B-channel processing section 12 configured to process a B-signal, an R-channel processing section 13 configured to process an R-signal, and a representative point color correction section 15. The G-channel processing section 11 performs a color correction process on G-image signals G1in, G2in, G3in, G4in to output G-image signals G1out, G2out, G3out, G4out. The B-channel processing section 12 performs a color correction process on B-image signals B1in, B2in, B3in, B4in to output B-image signals B1out, B2out, B3out, B4out. The R-channel processing section 13 performs a color correction process on R-image signals R1in, R2in, R3in, R4in to output R-image signals R1out, R2out, R3out, R4out.

The representative point color correction section 15 performs a predetermined color correction process on image signals of representative points of the pixel groups. As used herein, the term "representative point" refers to an imaginary point located at a position shifted from the pixel positions of the pixel group. In this example, the representative point is located in the center of the pixel group comprised of four adjoining pixels. The representative point color correction section 15 generates color-corrected image signals GAC, BAC, RAC from three signals, namely a G-image signal GA of the representative point received from the G-channel processing section 11, a B-image signal BA of the representative point received from the B-channel processing section 12, and an R-image signal RA of the representative point received from the R-channel processing section 13, by using a lookup table. The representative point color correction section 15 sends the color-corrected image signals GAC, BAC, RAC back to the G-channel processing section 11, the B-channel processing section 12, and the R-channel processing section 13, respectively.

Figure 2:
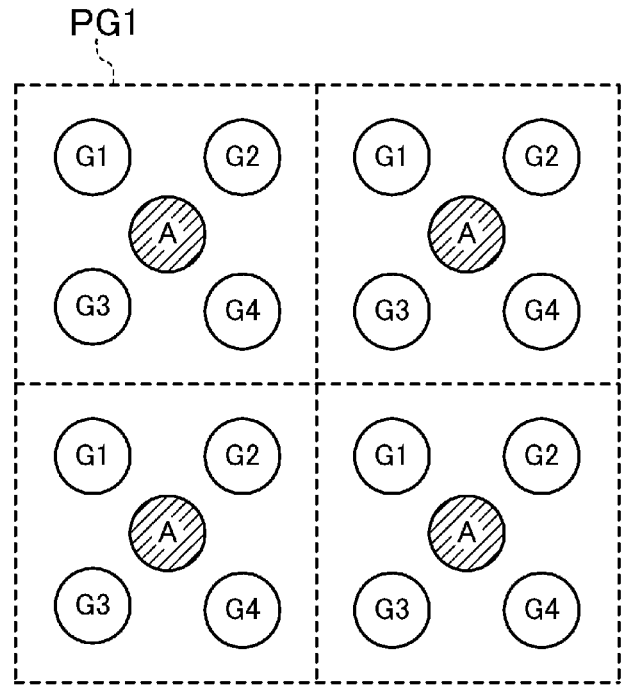
FIG. 2 shows an example of pixel groups in the first embodiment.

FIG. 2 is a schematic diagram showing an example of the pixel groups and the representative points in the present embodiment. In FIG. 2, each pixel group PG1 is comprised of four G-pixels G1, G2, G3, G4 arranged in a 2 by 2 matrix, namely two pixels in the vertical direction by two pixels in the horizontal direction, and the representative point A is located as an imaginary point in the center of the pixel group PG1. Although FIG. 2 shows "G" as an example, the same applies to "B" and "R."

The G-channel processing section 11 includes a representative point generation section 1, subtractors 2a, 2b, 2c, 2d, and adders 3a, 3b, 3c, 3d. The representative point generation section 1 generates the G-image signal GA of the representative point based on image signals of the peripheral pixels of the representative point. The subtractors 2a, 2b, 2c, 2d subtract the G-image signal GA of the representative point generated by the representative point generation section 1 from the G-image signals G1in, G2in, G3in, G4in applied to the color correction section 10, respectively. The adders 3a, 3b, 3c, 3d add the color-corrected image signal GAC of the representative point received from the representative point color correction section 15 to outputs G1D, G2D, G3D, G4D of the subtractors 2a, 2b, 2c, 2d, respectively. The outputs of the adders 3a, 3b, 3c, 3d are output as the G-image signals G1out, G2out, G3out, G4out from the G-channel processing section 11.

Each of the B-channel processing section 12 and the R-channel processing section 13 has a similar internal configuration to the G-channel processing section 11. The internal configurations of the B-channel processing section 12 and the R-channel processing section 13 are not shown in FIG. 1.

Figure 3:
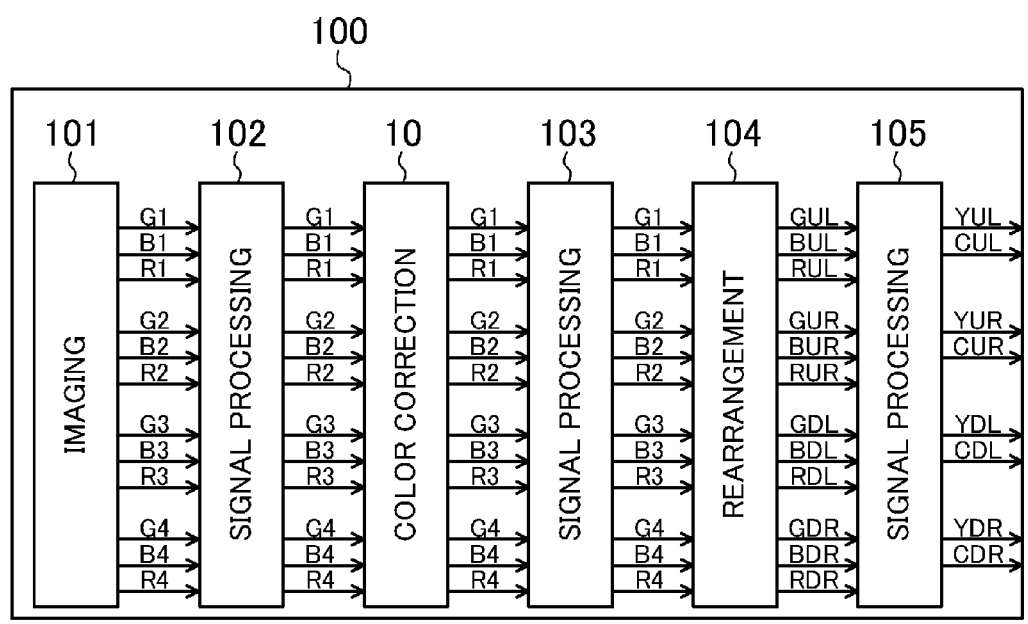
FIG. 3 is a configuration diagram of an image processing apparatus according to the first embodiment.

FIG. 3 shows a configuration example of the image processing apparatus according to the present embodiment. An image processing apparatus 100 of FIG. 3 includes the color correction section 10 of FIG. 1, an imaging section 101 including an imaging device, a signal processing section 102, a signal processing section 103, a rearrangement section 104, and a signal processing section 105.

[1-2. Operation]

The operation of the color correction section 10 configured as described above and the image processing apparatus 100 including the color correction section 10 will be described below. An example of generating an image having 3,840 pixels in the horizontal direction by 2,160 pixels in the vertical direction as effective pixels will be described. In this case, the image processing apparatus 100 corresponds to a so-called 4K camera.

First, in the image processing apparatus 100 of FIG. 3, the imaging section 101 has the imaging device having R, G, and B-pixels arranged in the respective pixel arrangement patterns. Quadruple parallel image signals of R, G, and B are output from the imaging section 101. That is, G-image signals G1, G2, G3, G4, B-image signals B1, B2, B3, B4, and R-image signals R1, R2, R3, R4 are output from the imaging section 101. Outputting the quadruple parallel image signals can reduce the clock frequency of the signal processing even if the number of pixels is large. This can prevent an unnecessary increase in circuit size for pipeline processing, and thus can reduce power consumption.

The image signals output from the imaging section 101 are adjusted in white balance or black level by the signal processing section 102. The image signals output from the signal processing section 102 are subjected to a predetermined color correction process by the color correction section 10. Subsequently, processing such as noise removal is performed by the signal processing section 103, and the image is divided into four in the vertical and horizontal directions by the rearrangement section 104 by using a frame memory. Image signals each having 1,920 pixels in the horizontal direction by 1,080 pixels in the vertical direction are thus generated. In FIG. 3, the signals after the rearrangement section 104 are denoted with "UL" (upper left), "UR" (upper right), "DL" (lower left), and "DR" (lower right). Each of the image signals is adjusted in frequency characteristics so as to enhance a high frequency component, etc. by the signal processing section 105, and is converted to a luminance signal Y and a color difference signal C. The luminance signals Y and the color difference signals C, which correspond to the image divided into four in the vertical and horizontal directions, are thus generated.

The operation of the color correction section 10 will be described. Although processing of G-signals by the G-channel processing section 11 is described below as an example, B-signals and R-signals are processed similarly.

First, the representative point generation section 1 generates the G-image signal GA of the representative point. In this example, the G-image signal GA of the representative point is obtained by averaging the four G-image signals G1in, G2in, G3in, G4in applied to the color correction section 10. The G-image signal GA of the representative point is applied to the representative point color correction section 15 and the subtractors 2a, 2b, 2c, 2d. The method for generating the image signal of the representative point is not limited to the one shown herein. For example, a part of the G-image signals included in the pixel group to be subjected to color correction may be used, or the G-image signal of a pixel other than the pixel group to be subjected to color correction may be used. Calculation other than the averaging may be used.

The subtractors 2a, 2b, 2c, 2d subtract the G-image signal GA of the representative point from the G-image signals G1in, G2in, G3in, G4in applied to the color correction section 10, thereby generating the differential signals G1D, G2D, G3D, G4D. The G-image signal GA of the representative point together with the image signals BA, RA generated similarly is converted in color by the representative color conversion section 15 by using the lookup table, whereby the color-corrected image signals GAC, BAC, RAC are generated.

The adders 3a, 3b, 3c, 3d add the image signal GAC output from the representative point color correction section 15 to the differential signals G1D, G2D, G3D, G4D output from the subtractors 2a, 2b, 2c, 2d, respectively. The outputs of the adders 3a, 3b, 3c, 3d are output as the color-corrected G-image signals G1out, G2out, G3out, G4out from the G-channel processing section 11.

The color-corrected B-image signals B1out, B2out, B3out, B4out are similarly generated by the B-channel processing section 12, and the color-corrected R-image signals R1out, R2out, R3out, R4out are similarly generated by the R-channel processing section 13.

[1-3. Advantages Etc.]

As described above, in the present embodiment, the color correction section 10 performs a color correction process on a pixel group-by-pixel group basis, and each pixel group is comprised of four adjoining pixels. The representative point generation section 1 generates, e.g., the G-image signal of the representative point located as an imaginary point in the pixel group. The subtractors 2a, 2b, 2c, 2d subtract the G-image signal of the representative point from the G-image signals of the pixel group. The representative point color correction section 15 performs the color correction process on the G-image signal of the representative point. The adders 3a, 3b, 3c, 3d add the color-corrected G-image signal of the representative point to the outputs of the subtractors 2a, 2b, 2c, 2d.

The color correction process of the image is thus performed by generating the image signal of the representative point located at a position shifted from the original pixel positions, performing color correction of the image signal of the representative point, and performing addition and subtraction of the image signal. Color correction can thus be implemented by a simple circuit configuration. That is, the circuits configured to generate the image signal of the representative point by simple calculation, and the adders and subtractors corresponding to the number of signal channels need only be provided in the configuration other than the portion for color correction. Accordingly, even in a configuration that performs the parallel processing for a large number of pixels, color correction can be implemented with a small circuit scale without causing significant degradation in most images.

Figure 4:
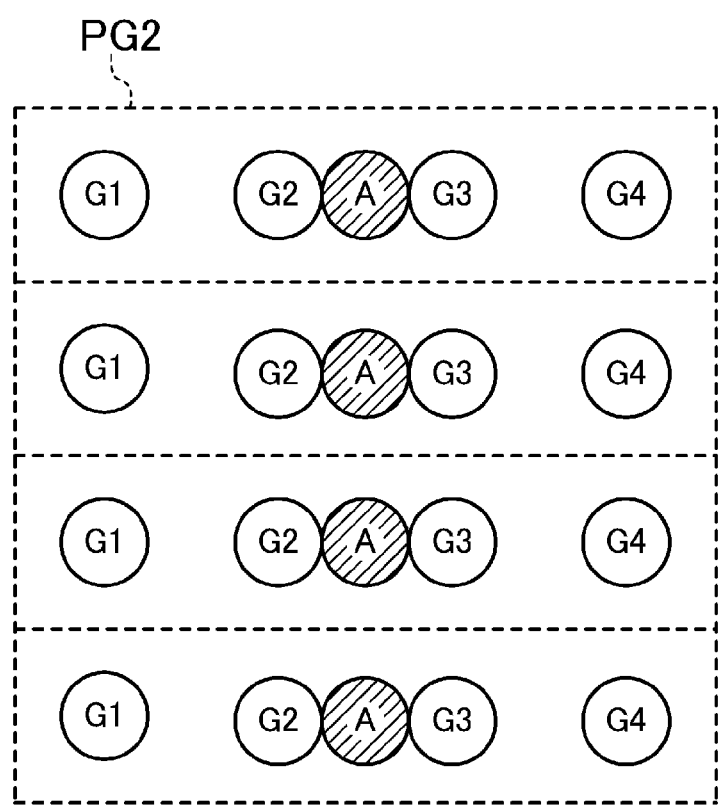
FIG. 4 shows another example of the pixel groups in the first embodiment.

In the present embodiment, the color correction process is performed on a pixel group-by-pixel group basis, and each pixel group is comprised of four pixels arranged in a 2 by 2 matrix as shown in FIG. 2. However, the present disclosure is not limited to this. For example, in the case where the image signal is output from the imaging section 101 by four pixels arranged in a 1 by 4 matrix, namely one pixel in the vertical direction by four pixels in the horizontal direction as shown in FIG. 4, the color correction process can be performed by the pixel group PG2 comprised of the four pixels arranged in a 1 by 4 matrix. In this case, the representative point A is located as an imaginary point, e.g., between the pixels G2 and G3.

Second Embodiment

A second embodiment will be described below with reference to FIGS. 5 to 7. As in the first embodiment, in the second embodiment, an imaging device configured to capture an image signal has pixels of R, G, and B at the same positions as final sample positions. Although quadruple parallel processing is performed in the first embodiment, double parallel processing is performed in the second embodiment as faster signal processing than the first embodiment can be implemented in the second embodiment.

[2-1. Configuration]

Figure 5:
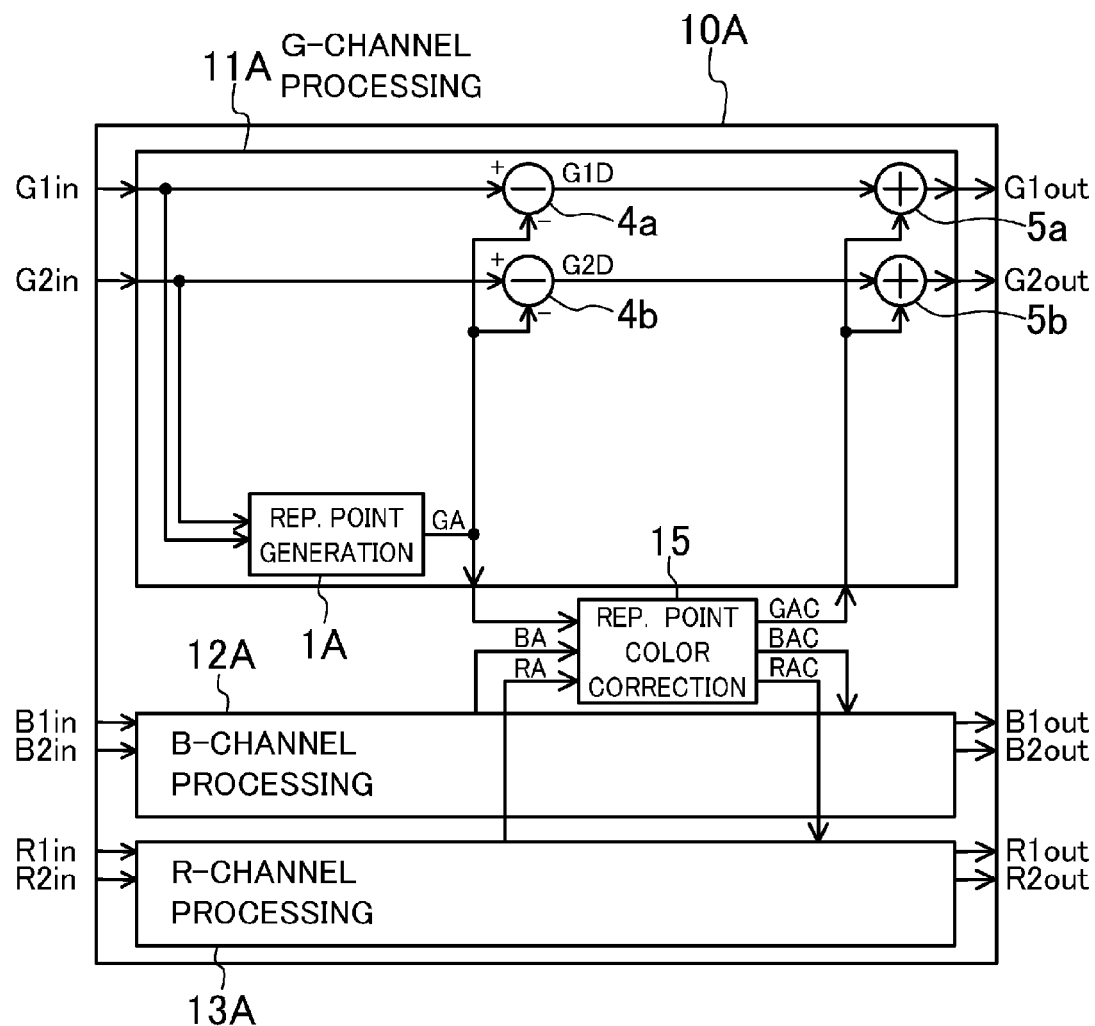
FIG. 5 is a configuration diagram of a color correction section according to a second embodiment.

FIG. 5 is a configuration diagram of a color correction section 10A according to the present embodiment. The color correction section 10A performs a color correction process on a pixel group-by-pixel group basis, and each pixel group is comprised of two adjoining pixels. The color correction section 10A includes a G-channel processing section 11A configured to process a G-image signal, a B-channel processing section 12A configured to process a B-image signal, an R-channel processing section 13A configured to process an R-image signal, and a representative point color correction section 15. The G-channel processing section 11A performs a color correction process on G-image signals G1in, G2in to output G-image signals G1out, G2out. The B-channel processing section 12A performs a color correction process on B-image signals B1in, B2in to output B-image signals B1out, B2out. The R-channel processing section 13A performs a color correction process on R-image signals R1in, R2in to output R-image signals R1out, R2out.

The representative point color correction section 15 performs a predetermined color correction process on image signals of representative points, and is similar in configuration and function to that shown in the first embodiment. The representative point color correction section 15 generates color-corrected image signals GAC, BAC, RAC from three signals, namely a G-image signal GA of the representative point received from the G-channel processing section 11A, a B-image signal BA of the representative point received from the B-channel processing section 12A, and an R-image signal RA of the representative point received from the R-channel processing section 13A, by using a lookup table. The representative point color correction section 15 sends the color-corrected image signals GAC, BAC, RAC back to the G-channel processing section 11A, the B-channel processing section 12A, and the R-channel processing section 13A, respectively.

Figure 6:
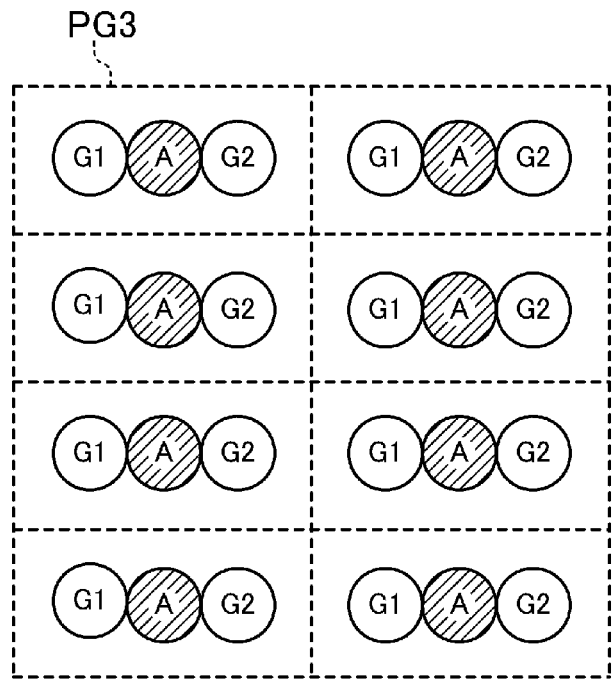
FIG. 6 shows an example of pixel groups in the second embodiment.

FIG. 6 is a schematic diagram showing an example of the pixel groups and the representative points in the present embodiment. In FIG. 6, each pixel group PG3 is comprised of two G-pixels G1, G2 arranged in a 1 by 2 matrix, namely one pixel in the vertical direction by two pixels in the horizontal direction, and the representative point A is located as an imaginary point in the center of the pixel group PG3, namely between two G-pixels G1, G2. Although FIG. 6 shows "G" as an example, the same applies to "B" and "R."

The G-channel processing section 11A includes a representative point generation section 1A, subtractors 4a, 4b, and adders 5a, 5b. The representative point generation section 1A generates the G-image signal GA of the representative point based on image signals of the peripheral pixels of the representative point. The subtractors 4a, 4b subtract the G-image signal GA of the representative point generated by the representative point generation section 1A from the G-image signals G1in, G2in applied to the color correction section 10A, respectively. The adders 5a, 5b add the color-corrected image signal GAC received from the representative point color correction section 15 to outputs G1D, G2D of the subtractors 4a, 4b, respectively. The outputs of the adders 5a, 5b are output as the G-image signals G1out, G2out from the G-channel processing section 11A.

Each of the B-channel processing section 12A and the R-channel processing section 13A has a similar internal configuration to the G-channel processing section 11A, and the internal configurations of the B-channel processing section 12A and the R-channel processing section 13A are not shown in FIG. 5.

Figure 7:
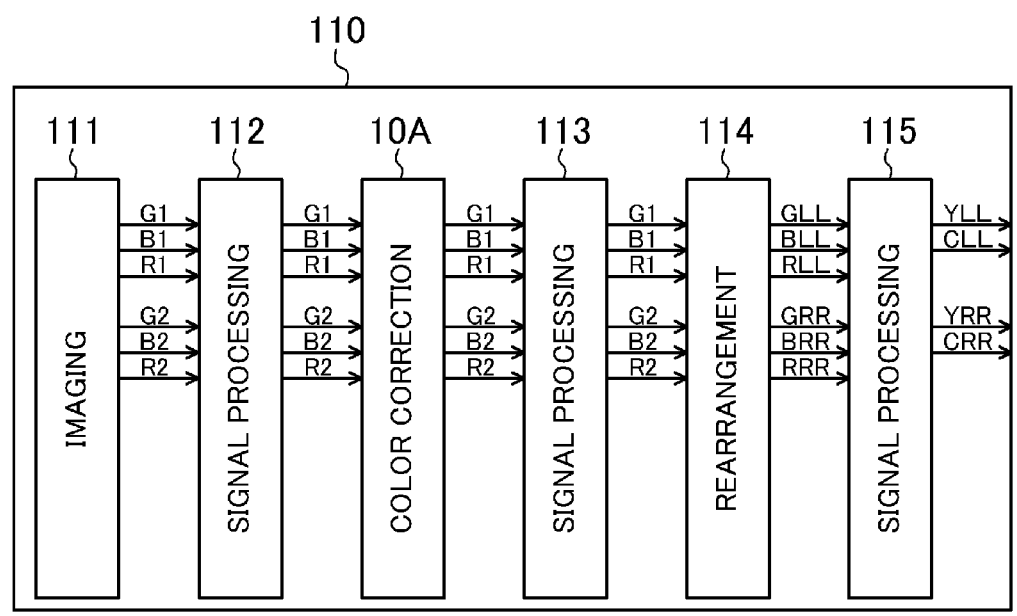
FIG. 7 is a configuration diagram of an image processing apparatus according to the second embodiment.

FIG. 7 shows a configuration example of the image processing apparatus according to the present embodiment. An image processing apparatus 110 of FIG. 7 includes the color correction section 10A of FIG. 5, an imaging section 111 including an imaging device, a signal processing section 112, a signal processing section 113, a rearrangement section 114, and a signal processing section 115.

[2-2. Operation]

The operation of the color correction section 10A configured as described above and the image processing apparatus 110 including the color correction section 10A will be described below. An example of generating an image having 3,840 pixels in the horizontal direction by 2,160 pixels in the vertical direction as effective pixels will be described. In this case, the image processing apparatus 110 corresponds to a so-called 4K camera.

First, in the image processing apparatus 110 of FIG. 7, the imaging section 111 has the imaging device having R, G, and B-pixels arranged in the respective pixel arrangement patterns. Double parallel image signals of R, G, and B are output from the imaging section 111. That is, G-image signals G1, G2, B-image signals B1, B2, and R-image signals R1, R2 are output from the imaging section 111. Outputting the double parallel image signals can reduce the clock frequency of the signal processing even if the number of pixels is large. This can prevent an unnecessary increase in circuit size for pipeline processing, and thus can reduce power consumption.

The image signals output from the imaging section 111 are adjusted in white balance or black level by the signal processing section 112. The image signals output from the signal processing section 112 are subjected to a predetermined color correction process by the color correction section 10A. Subsequently, processing such as noise removal is performed by the signal processing section 113, and the image is divided into four in the vertical and horizontal directions by the rearrangement section 114 by using a frame memory. Image signals each having 1,920 pixels in the horizontal direction by 1,080 pixels in the vertical direction are thus generated. Each of the image signals is adjusted in frequency characteristics so as to enhance a high frequency component, etc. by the signal processing section 115, and is converted to a luminance signal Y and a color difference signal C. The luminance signals Y and the color difference signals C, which correspond to the image divided into four in the vertical and horizontal directions, are thus generated. Unlike the first embodiment, the number of signal channels is two in the present embodiment. Accordingly, after the rearrangement section 114 where the image is divided into four, the signals are output as a channel 1 (denoted with "LL" in FIG. 7) that is a mixture of upper and lower left image signals mixed at every other clock and a channel 2 (denoted with "RR" in FIG. 7) that is a mixture of upper and lower right image signals mixed at every other clock, and are sent to a recording part of a media such as an SD card.

The operation of the color correction section 10A will be described. Although processing of G-signals by the G-channel processing section 11A is described below as an example, B-signals and R-signals are processed similarly.

First, the representative point generation section 1A generates the G-image signal GA of the representative point. In this example, the G-image signal GA of the representative point is obtained by averaging the two G-image signals G1in, G2in applied to the color correction section 10A. The G-image signal GA of the representative point is applied to the representative point color correction section 15 and the subtractors 4a, 4b. The method for generating the image signal of the representative point is not limited to the one shown herein. For example, the G-image signal of a pixel other than the pixel group to be subjected to color correction may be used. Calculation other than the averaging may be used.

The subtractors 4a, 4b subtract the G-image signal GA of the representative point from the two G-image signals G1in, G2in applied to the color correction section 10A, thereby generating the differential signals G1D, G2D. The G-image signal GA of the representative point together with the image signals BA, RA generated similarly is converted in color by the representative color conversion section 15 by using the lookup table, whereby the color-corrected image signals GAC, BAC, RAC are generated.

The adders 5a, 5b add the image signal GAC to the differential signals G1D, G2D output from the subtractors 4a, 4b, respectively. The outputs of the adders 5a, 5b are output as the color-corrected G-image signals G1out, G2out from the G-channel processing section 11A.

The color-corrected B-image signals B1out, B2out are similarly generated by the B-channel processing section 12A, and the color-corrected R-image signals R1out, R2out are similarly generated by the R-channel processing section 13A.

[2-3. Advantages Etc.]

As described above, in the present embodiment, the color correction section 10A performs a color correction process on a pixel group-by-pixel group basis, and each pixel group is comprised of two adjoining pixels. The representative point generation section 1A generates, e.g., the G-image signal of the representative point located as an imaginary point in the pixel group. The subtractors 4a, 4b subtract the G-image signal of the representative point from the G-image signals of the pixel group. The representative point color correction section 15 performs the color correction process on the G-image signal of the representative point. The adders 5a, 5b add the color-corrected G-image signal of the representative point to the outputs of the subtractors 4a, 4b.

The color correction process of the image is thus performed by generating the image signal of the representative point located at a position shifted from the original pixel positions, performing color correction of only the image signal of the representative point, and performing addition and subtraction of the image signal. Color correction can thus be implemented by a simple circuit configuration. Accordingly, even in a configuration that performs the parallel processing for a large number of pixels, color correction can be implemented with a small circuit scale without causing significant degradation in most images.

Figure 8:
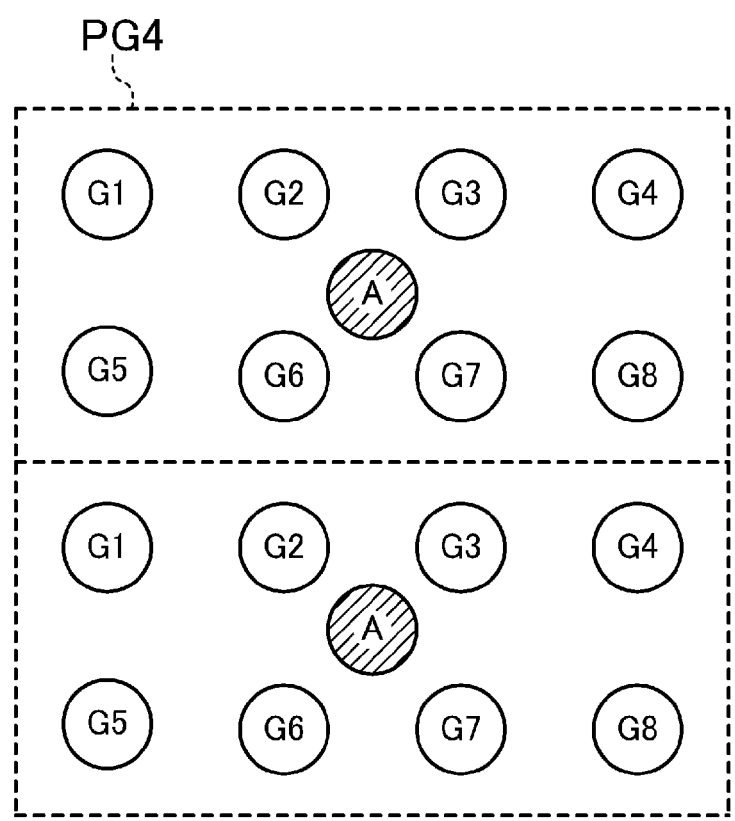
FIG. 8 shows another example of the pixel groups to be subjected to a color correction process.

The first embodiment is described with respect to an example in which the color correction process is performed on a pixel group-by-pixel group basis, and each pixel group is comprised of four pixels, and the second embodiment is described with respect to an example in which the color correction process is performed on a pixel group-by-pixel group basis, and each pixel group is comprised of two pixels. In the present disclosure, however, the number of pixels in each pixel group is not limited to these examples. For example, the present disclosure is applicable to the configuration in which the color correction process is performed on a pixel group-by-pixel group basis and each pixel group PG4 is comprised of eight pixels arranged in a 2 by 4 matrix, namely two pixels in the vertical direction by four pixels in the horizontal direction, as shown in FIG. 8. In this case, the representative point A is located as an imaginary point, e.g., in the center of the pixel group PG4 as shown in FIG. 8. The present disclosure is applicable to pixel groups with other configurations such as those comprised of pixels arranged in a 2 by 3 matrix or in a 4 by 4 matrix.

Third Embodiment

A third embodiment will be described with reference to FIGS. 9 to 13. In the third embodiment, an imaging device configured to capture an image signal is of a Bayer array type.

[3-1. Configuration]

Figure 9:
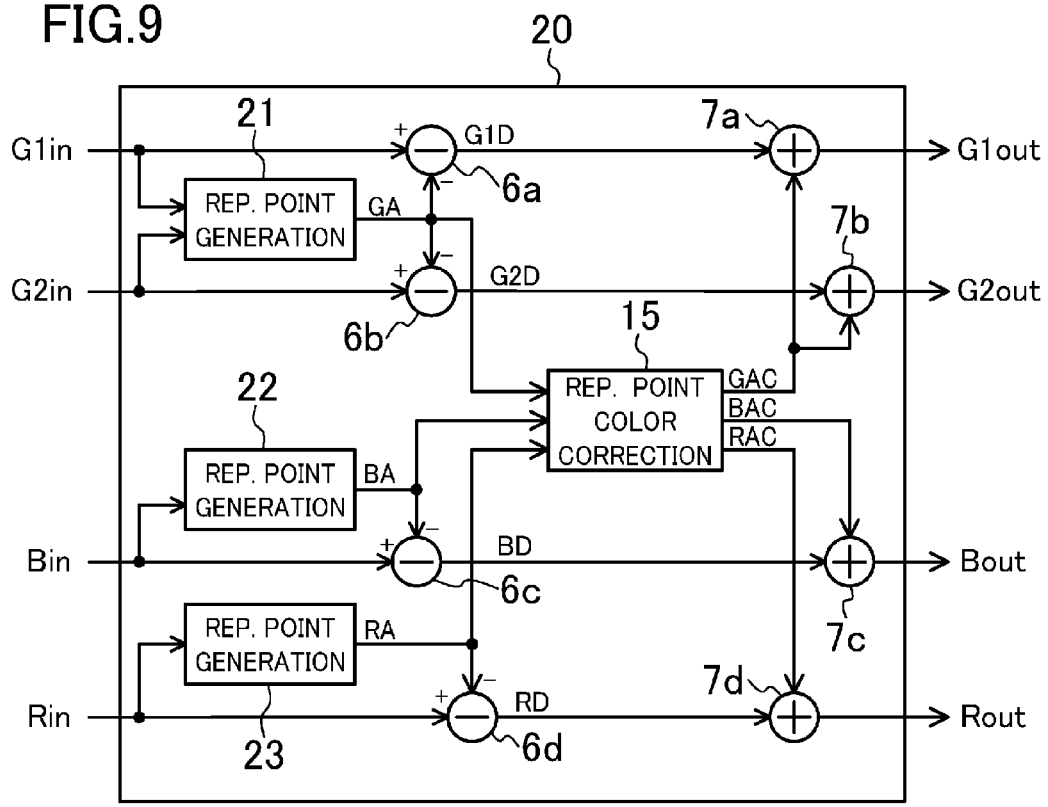
FIG. 9 is a configuration diagram of a color correction section according to a third embodiment.
Figure 10:
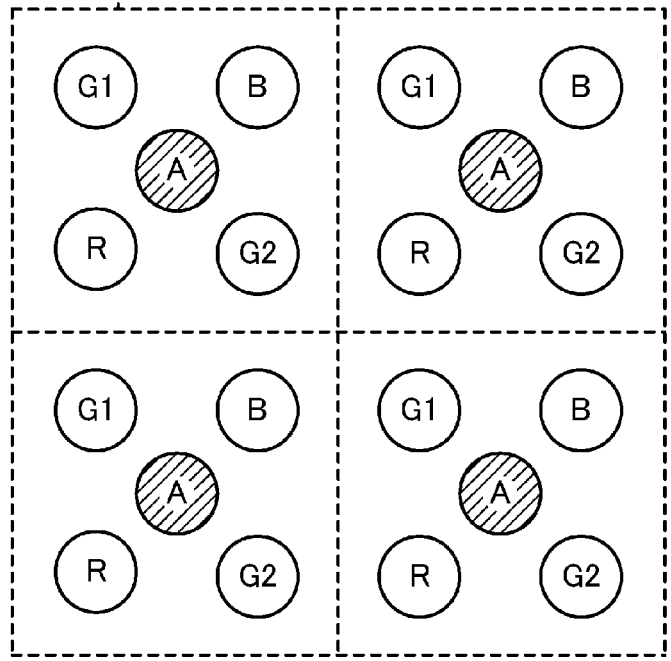
FIG. 10 shows an example of pixel groups in the third embodiment.

FIG. 9 is a configuration diagram of a color correction section 20 according to the present embodiment. The color correction section 20 performs a color correction process on a pixel group-by-pixel group basis, and each pixel group is comprised of four adjoining pixels. As shown in FIG. 10, in the present embodiment, each pixel group PG5 is comprised of two G-pixels, one B-pixel, and one R-pixel. The representative point is located as an imaginary point in the center of the pixel group PG5.

The color correction section 20 includes representative point generation sections 21, 22, 23, a representative point color correction section 15, subtractors 6a, 6b, 6c, 6d, and adders 7a, 7b, 7c, 7d. The representative point color correction section 15 performs a predetermined color correction process on image signals of representative points, and is similar in configuration and function to that shown in the first embodiment. The representative point color correction section 15 generates color-corrected image signals GAC, BAC, RAC from three namely image signals GA, BA, RA of the representative points by using a lookup table.

The representative point generation section 21 generates the G-image signal GA of the representative point based on image signals of the peripheral pixels of the representative point. The subtractors 6a, 6b subtract the G-image signal GA of the representative point generated by the representative point generation section 21 from G-image signals G1in, G2in applied to the color correction section 20, respectively. The adders 7a, 7b add the color-corrected image signal GAC generated by the representative point color correction section 15 to outputs G1D, G2D of the subtractors 6a, 6b, respectively. The outputs of the adders 7a, 7b are output as G-image signals G1out, G2out from the color correction section 20.

The representative point generation section 22 generates the B-image signal BA of the representative point based on image signals of the peripheral pixels of the representative point. The subtractor 6c subtracts the B-image signal BA of the representative point generated by the representative point generation section 22 from a B-image signals Bin applied to the color correction section 20. The adder 7c adds the color-corrected image signal BAC generated by the representative point color correction section 15 to an output BD of the subtractor 6c. The output of the adder 7c is output as a B-image signal Bout from the color correction section 20.

The representative point generation section 23 generates the R-image signal RA of the representative point based on image signals of the peripheral pixels of the representative point. The subtractor 6d subtracts the R-image signal RA of the representative point generated by the representative point generation section 23 from an R-image signal Rin applied to the color correction section 20. The adder 7d adds the color-corrected image signal RAC generated by the representative point color correction section 15 to an output RD of the subtractor 6d. The output of the adder 7d is output as an R-image signal Rout from the color correction section 20.

Figure 11:
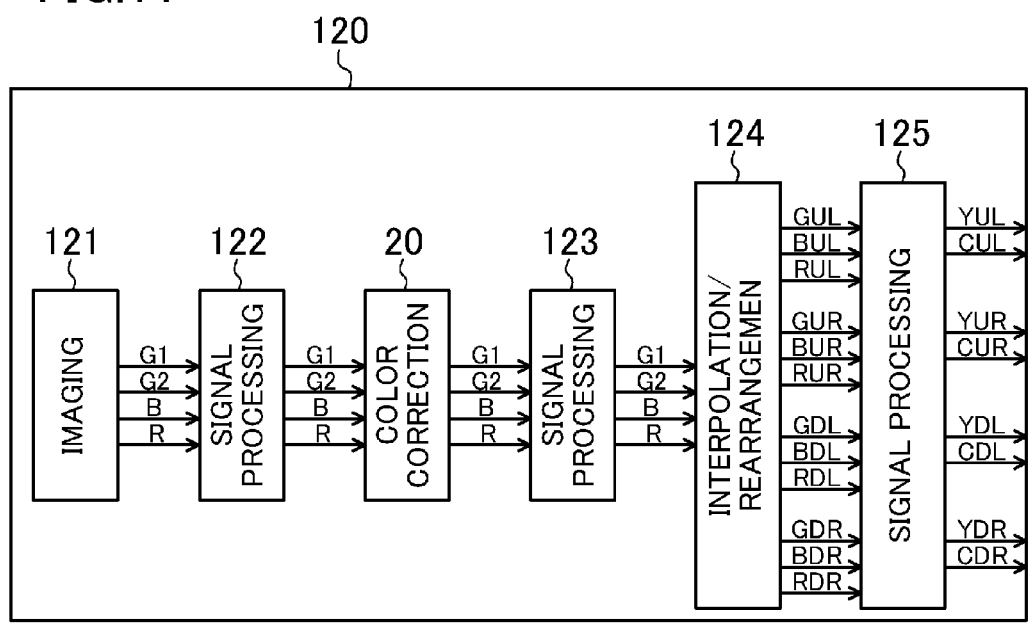
FIG. 11 is a configuration diagram of an image processing apparatus according to the third embodiment.

FIG. 11 is shows a configuration example of the image processing apparatus according to the present embodiment. An image processing apparatus 120 of FIG. 11 includes the color correction section 20 of FIG. 9, an imaging section 121 including an imaging device, a signal processing section 122, a signal processing section 123, an interpolation/rearrangement section 124, and a signal processing section 125.

[3-2. Operation]

The operation of the color correction section 20 configured as described above and the image processing apparatus 120 including the color correction section 20 will be described below. An example of generating an image having 3,840 pixels in the horizontal direction by 2,160 pixels in the vertical direction as effective pixels will be described. In this case, the image processing apparatus 120 corresponds to a so-called 4K camera. Although FIG. 10 shows only four pixel groups PG5, there are the 3,840 by 2,160 pixels as effective pixels and ten or more pixels on each of the four sides (upper, lower, right, and left sides).

First, in the image processing apparatus 120 of FIG. 11, the imaging section 121 has the imaging device having R, G, and B-pixels arranged as shown in FIG. 10. Four image signals G1, G2, B, R are output from the imaging section 121. At this time, the total number of effective pixels of the signals G1, G2, B, R is 3,840 pixels in the horizontal direction by 2,160 pixels in the vertical direction, and the number of effective pixels in the signal G1 is one quarter of this value, namely 1,920 in the horizontal direction by 1,080 pixels in the horizontal direction. Outputting the four separate image signals can reduce the clock frequency of the signal processing even if the number of pixels is large. This can prevent an unnecessary increase in circuit size for pipeline processing, and thus can reduce power consumption.

The image signals output from the imaging section 121 are adjusted in white balance or black level by the signal processing section 122. The image signals output from the signal processing section 122 are subjected to a predetermined color correction process by the color correction section 20 by using, e.g., a lookup table. Subsequently, processing such as noise removal is performed by the signal processing section 123. The interpolation/rearrangement section 124 performs an interpolation process of each image signal G1, G2, B, R having 1,920 in the horizontal direction by 1,080 pixels in the horizontal direction by using a frame memory, thereby generating an image having 3,840 pixels in the horizontal direction by 2,160 pixels in the vertical direction as effective pixels. The interpolation/rearrangement section 124 further divides the image into four in the vertical and horizontal directions to generate four image signals each having 1,920 in the horizontal direction by 1,080 pixels in the horizontal direction. In FIG. 11, the signals after the interpolation/rearrangement section 104 are denoted with "UL" (upper left), "UR" (upper right), "DL" (lower left), and "DR" (lower right). Each of the image signals is adjusted in frequency characteristics so as to enhance a high frequency component, etc. by the signal processing section 125, and is converted to a luminance signal Y and a color difference signal C. The luminance signals Y and the color difference signals C, which correspond to the image divided into four in the vertical and horizontal directions, are thus generated.

The operation of the color correction section 20 will be described.

Image signals G1in, G2in, Bin, Rin for the four pixels in the pixel group PG5 arranged as shown in FIG. 10 are applied to the color correction section 20. The representative point generation sections 21, 22, 23 generate a G-image signal GA, a B-image signal BA, and an R-image signal RA of the representative point, respectively. The representative point generation section 21 generates the G-image signal GA of the representative point by averaging the image signals G1in, G2in.

Figure 12A:
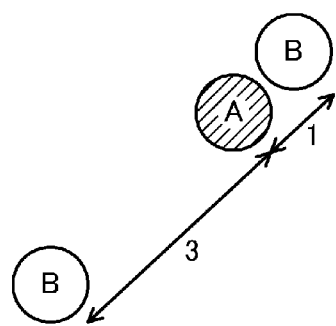
FIGS. 12A and 12B are diagrams showing examples of a method for generating an image signal of a representative point.
Figure 12B:
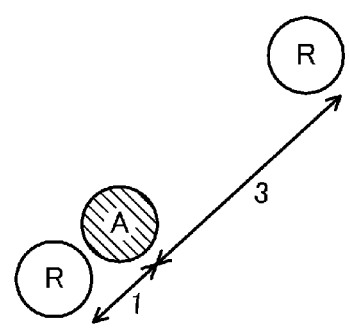

FIG. 12A shows an example of a method for generating the B-image signal BA of the representative point, and FIG. 12B shows an example of a method for generating the R-image signal RA of the representative point. As shown in FIG. 12A, the ratio of the distance from the representative point A to the upper right B-signal included in this pixel group and the distance from the representative point A to a B-signal included in a pixel group located on the lower left side of this pixel group is "1:3." Accordingly, the representative point generation section 22 generates the B-image signal BA by internally dividing the upper right B-signal and the lower left B-signal by the ratio of "3:1." As shown in FIG. 12B, the ratio of the distance from the representative point A to the lower left R-signal included in this pixel group and the distance from the representative point A to an R-signal included in a pixel group located on the upper right side of this pixel group is "1:3." Accordingly, the representative point generation section 23 generates the R-image signal RA by internally dividing the lower left R-signal and the upper right R-signal by the ratio of "3:1." The method for generating the image signal of the representative point is not limited to these.

The subtractors 6a, 6b subtract the G-image signal GA of the representative point from the two G-image signals G1in, G2in applied to the color correction section 20, thereby generating differential signals G1D, G2D. Similarly, the subtractor 6c subtracts the B-image signal BA of the representative point from the image signal Bin applied to the color correction section 20, thereby generating a differential signal BD. The subtractor 6d subtracts the R-image signal RA of the representative point from the image signal Rin applied to the color correction section 20, thereby generating a differential signal RD. The G-image signal GA, the B-image signal BA, and the R-image signal RA of the representative point are subjected to a predetermined color correction process in the representative color conversion section 15. For example, the G-image signal GA, the B-image signal BA, and the R-image signal RA of the representative point are converted in color by using the lookup table, whereby a color-corrected G-image signal GAC, a color-corrected B-image signal BAC, and a color-collected R-image signal RAC of the representative signal are output from the representative color conversion section 15.

The adders 7a, 7b add the color-corrected G-image signal GAC of the representative point to the differential signals G1D, G2D, respectively. The outputs of the adders 7a, 7b are output as color-corrected G-image signals G1out, G2out from the color correction section 20. The adder 7c adds the color-corrected B-image signal BAC of the representative point to the differential signal BD. The output of the adder 7c is output as a color-corrected B-image signal Bout from the color correction section 20. The adder 7d adds the color-corrected R-image signal BAC of the representative point to the differential signal RD. The output of the adder 7d is output as a color-corrected R-image signal Rout from the color correction section 20.

[3-3. Advantages Etc.]

As described above, in the present embodiment, the color correction section 20 performs a color correction process on a pixel group-by-pixel group basis, and each pixel group is comprised of four adjoining pixels. The representative point generation section 21 generates the G-image signal of the representative point located as an imaginary point in the pixel group. The subtractors 6a, 6b subtract the G-image signal of the representative point from the G-image signals of the pixel group. The representative point generation section 22 generates the B-image signal of the representative point located as an imaginary point in the pixel group. The subtractor 6c subtracts the B-image signal of the representative point from the B-image signal of the pixel group. The representative point generation section 23 generates the R-image signal of the representative point located as an imaginary point in the pixel group. The subtractor 6d subtracts the R-image signal of the representative point from the R-image signal of the pixel group. The representative point color correction section 15 performs the color correction process on the G, B, and R-image signals of the representative point. The adders 7a, 7b add the color-corrected G-image signal of the representative point to the outputs of the subtractors 6a, 6b. The adder 7c adds the color-corrected B-image signal of the representative point to the output of the subtractor 6c. The adder 7d adds the color-corrected R-image signal of the representative point to the output of the subtractor 6d.

The color correction process of the image is thus performed by generating the image signals of the representative point located at a position shifted from the original pixel positions, performing color correction of the image signals of the representative point, and performing addition and subtraction of the image signals. Color correction can thus be implemented by a simple circuit configuration. That is, the circuits configured to generate the image signal of the representative signal by simple calculation, and the subtractors and adders corresponding to the number of signal channels need only be provided in the portion other than the portion for color correction. Accordingly, even in a configuration that performs the parallel processing for a large number of pixels, color correction can be implemented with a small circuit scale without causing significant degradation in most images.

Figure 13:
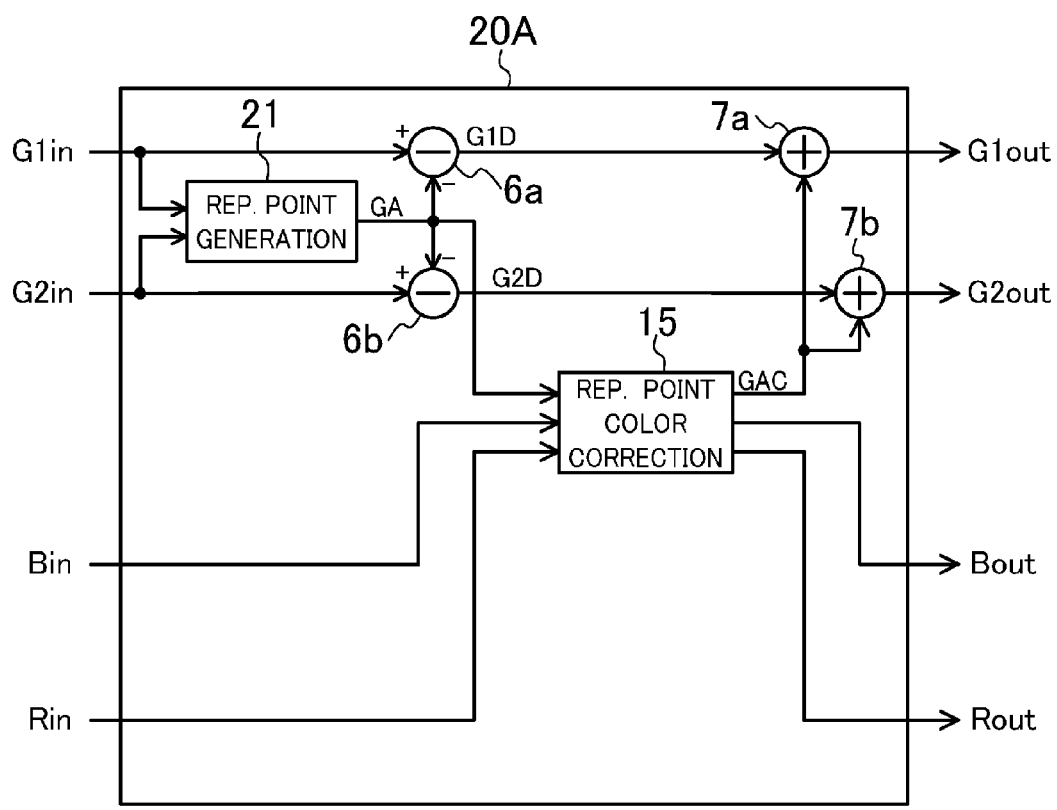
FIG. 13 is another configuration diagram of the color correction section according to the third embodiment.

In order to reduce the circuit scale, the B or R image signal in the pixel group may be used as it is as the image signal of the representative point. FIG. 13 shows a configuration example of a color correction section 20A in this case. The representative point generation sections 22, 23, the subtractors 6c, 6d, and the adders 7c, 7d in the configuration of FIG. 9 are omitted in the configuration of FIG. 13. The image signal Bin, Rin applied to the color correction section 20A are applied as they are to the representative point color correction section 15, where a color correction process is performed to output color-collected image signals Bout, Rout.

Other Embodiments

As described above, the first to third embodiments are described as examples of the technique disclosed in the present application. However, the technique in the present disclosure is not limited to these, and various modifications, replacements, additions, omissions, etc. may be made as appropriate without departing from the scope of the disclosure. Other embodiments may be implemented by combining the components described in the first to third embodiments.

Other embodiments are shown below by way of example.

In the first to third embodiments, no color correction process is performed on the differential signals each generated by subtracting the image signal of the representative point from the captured original image signal. This is because the differential signals often have a very small value, and are less likely to be significantly changed by the color correction process. That is, in most cases, no problem is caused by not performing the color correction process on the differential signals. However, the color correction process can also be performed on the differential signals when it is desired to implement the color correction process more accurately.

For example, in the example of the first embodiment, each of the outputs of the subtractors 2a, 2b, 2c, 2d is first multiplied by the ratio of the image signal of the representative signal after the color correction process to the image signal of the representative signal before the color correction process, and then the image signal of the representative point after the color correction process is added to each of the multiplication results. In the case of the G-signal, each of the differential signals G1D to G4D is first multiplied by the image signal GAC divided by the image signal GA, and then the image signal GAC is added to each of the multiplication results. Similar processing is performed for the B and R-signals. In the example of the second embodiment, each of the outputs of the subtractors 4a, 4b is first multiplied by the ratio of the image signal of the representative signal after the color correction process to the image signal of the representative signal before the color correction process, and then the image signal of the representative point after the color correction process is added to each of the multiplication results. In the case of the G-signal, each of the differential signals G1D, G2D is first multiplied by the image signal GAC divided by the image signal GA, and then the image signal GAC is added to each of the multiplication results. Similar processing is performed for the B and R-signals. In the example of the third embodiment, each of the outputs of the subtractors 6a, 6b, 6c, 6d is first multiplied by the ratio of the image signal of the representative signal after the color correction process to the image signal of the representative signal before the color correction process, and then the image signal of the representative point after the color correction process is added to each of the multiplication results. In the case of the G-signal, each of the differential signals G1D, G2D is first multiplied by the image signal GAC divided by the image signal GA, and then the image signal GAC is added to each of the multiplication results. Similar processing is performed for the B and R-signals.

In the first to third embodiments, the image processing apparatus including the color correction section is a camera including the imaging section. However, the present disclosure is not limited to this. For example, the image processing apparatus may be a playback apparatus including a video input section instead of the imaging section.

In the present disclosure, the position of the representative point need not necessarily be the center of the pixel group. The number of pixels in the pixel group need not necessarily be an even number.

As a comparative example, there is a method in which predetermined pixel positions are sampled from pixel arrangement positions of an imaging device, a color correction process is performed on image signals of the sampled pixels, and an interpolation process is performed by using the color-corrected image signals to compensate for other pixels. This method tends to cause unevenness of the image due to the influence of frequency characteristics of the pixel sampling. In order to avoid this problem, an interpolation process using many peripheral pixels can be performed. However, this requires a filter with a large number of taps, which increases the circuit scale.

On the other hand, in the present disclosure, the image signal is generated for the representative point that is located as an imaginary point at a position shifted from the pixel positions of the pixel group comprised of a plurality of adjoining pixels. The image signal of the representative point is subtracted from actual image signals, and the color-corrected image signal of the representative point is added to the subtraction results. The technique of the present disclosure therefore does not cause unevenness of the image, which is the problem of the comparative example, and also reduces the circuit scale.

The embodiments are described above as examples of the technique of the present disclosure. The attached drawings and the above detailed description are provided in order to describe these embodiments.

Accordingly, not only the components that are essential for solving the problem but also the components that are not essential for solving the problem may be included in the components shown in the attached drawings and the detailed description. Even if those non-essential components are shown in the drawings or the detailed description, these components should not be construed as essential components.

The above embodiments are shown by way of example in order to describe the technique of the present disclosure, and therefore various modifications, replacements, additions, omissions, etc. can be made without departing from the scope of the claims.

The present disclosure is applicable to image signal processing apparatuses configured to perform color correction of an image having a large number of pixels. Specifically, the present disclosure is applicable to digital still cameras, camcorders, mobile phones with a camera function, smartphones, hard disc recorders, etc.

What is claimed is:

1. An image processing apparatus, comprising:
a color correction section configured to perform a color correction process on an image signal, wherein
the color correction section performs the color correction process on a pixel group-by-pixel group basis, each pixel group being comprised of an even number of adjoining pixels, and includes
a representative point generation section configured to generate an image signal of a predetermined color of a representative point located as an imaginary point in a center of the pixel group, based on an image signal of a peripheral pixel of the representative point,
a subtraction section configured to subtract the image signal of the representative point generated in the representative point generation section from an image signal of a pixel of the predetermined color in the pixel group,
a representative point color correction section configured to perform the color correction process on the image signal of the representative point generated in the representative point generation section, and
an addition section configured to add the image signal of the representative point after the color correction process of the representative point color correction section to the subtraction result of the subtraction section.

2. The image processing apparatus of claim 1, wherein the color correction section multiplies the subtraction result of the subtraction section by a ratio of the image signal of the representative point after the color correction process to the image signal of the representative point before the color correction process, and then adds the image signal of the representative point after the color correction process to the multiplication result.

3. The image processing apparatus of claim 1, wherein the pixel group includes four pixels of the predetermined color which are arranged in a 2 by 2 matrix.

4. The image processing apparatus of claim 1, wherein the image signal corresponds to a Bayer pattern, and the pixel group includes four pixels arranged in a 2 by 2 matrix, and the four pixels are comprised of one red pixel, two green pixels, and one blue pixel.

5. The image processing apparatus of claim 4, wherein
for red or blue, the representative point generation section generates the image signal of the representative point by using an image signal of a peripheral red or blue pixel of the representative point.

6. The image processing apparatus of claim 4, wherein
for red or blue, the color correction section uses the image signal of the red or blue pixel in the pixel group as the image signal of the representative point.

7. An image processing apparatus, comprising:
a color correction section configured to perform a color correction process on an image signal, wherein
the color correction section performs the color correction process on a pixel group-by-pixel group basis, each pixel group being comprised of a plurality of adjoining pixels, and includes
a representative point generation section configured to generate an image signal of a predetermined color of a representative point located as an imaginary point at a position shifted from pixel positions of the pixel group, based on an image signal of a peripheral pixel of the representative point,
a subtraction section configured to subtract the image signal of the representative point generated in the representative point generation section from an image signal of a pixel of the predetermined color in the pixel group,
a representative point color correction section configured to perform the color correction process on the image signal of the representative point generated in the representative point generation section, and
an addition section configured to add the image signal of the representative point after the color correction process of the representative point color correction section to the subtraction result of the subtraction section.

* * * * *